United States Patent
Martinez et al.

(10) Patent No.: US 9,783,223 B2
(45) Date of Patent: Oct. 10, 2017

(54) STEERING COLUMN ASSEMBLY WITH TILT ADJUSTMENT AND IMPROVED ASSEMBLY METHOD FOR RESISTING LASH

(71) Applicant: NSK AMERICAS, INC., Ann Arbor, MI (US)

(72) Inventors: Victor Martinez, Ann Arbor, MI (US); David Ray Hartman, Brighton, MI (US)

(73) Assignee: NSK Americas, Inc., Ann Arbor, MI (US)

( * ) Notice: Subject to any disclaimer, the term of this patent is extended or adjusted under 35 U.S.C. 154(b) by 0 days.

(21) Appl. No.: 15/322,651

(22) PCT Filed: Jul. 1, 2015

(86) PCT No.: PCT/US2015/038769
§ 371 (c)(1),
(2) Date: Dec. 28, 2016

(87) PCT Pub. No.: WO2016/004167
PCT Pub. Date: Jan. 7, 2016

(65) Prior Publication Data
US 2017/0129529 A1 May 11, 2017

Related U.S. Application Data

(60) Provisional application No. 62/020,077, filed on Jul. 2, 2014.

(51) Int. Cl.
*B62D 1/189* (2006.01)
*B62D 1/181* (2006.01)
(52) U.S. Cl.
CPC ............ *B62D 1/189* (2013.01); *B62D 1/181* (2013.01)

(58) Field of Classification Search
CPC combination set(s) only.
See application file for complete search history.

(56) References Cited

U.S. PATENT DOCUMENTS 5,673,938 A * 10/1997 Kaliszewski .......... B62D 1/195
248/231.31
5,769,455 A * 6/1998 Duval .................... B62D 1/195
280/777
(Continued)

FOREIGN PATENT DOCUMENTS

CH DE 19715873 C1 * 8/1998 ........... B62D 25/147
DE 102010005081 A1 9/2010
(Continued)

OTHER PUBLICATIONS

Search Report and Written Opinion for International Application No. PCT/US2015/038769 dated Sep. 29, 2015.

*Primary Examiner* — Nicole T Verley
(74) *Attorney, Agent, or Firm* — The Dobrusin Law Firm, P.C.

(57) ABSTRACT

A steering column assembly (100) and method for an automotive vehicle, comprising: an inner column tube (102), a steering shaft (104), at least one bracket structure, such as a top bracket (106), adapted for receiving a least a portion of the steering shaft and for mounting the steering column assembly within the automotive vehicle, the at feast one bracket structure (e.g., top bracket) including a side wall (124). A column housing (110) is pivotally coupled with the at least one bracket structure. An adjustable spacer (130) is disposed between the column housing and the top bracket and is mounted to the side wall of the at least one bracket structure by a single fastener (128), by a generally vertically oriented fastener adapted for allowing lateral translation (e.g., by sliding) for position adjustment of the spacer or both. The exposed surface of the spacer is in facing relation
(Continued)

with a part of the column housing for contacting the column housing during a tilt adjustment.

20 Claims, 6 Drawing Sheets

(56) References Cited

U.S. PATENT DOCUMENTS

| | | | | |
|---|---|---|---|---|
| 6,033,145 | A * | 3/2000 | Xu | B62D 1/10 403/256 |
| 7,640,824 | B2 * | 1/2010 | Manwaring | B62D 1/184 74/492 |
| 2005/0016314 | A1 * | 1/2005 | Kinme | B62D 5/0403 74/493 |
| 2009/0031844 | A1 | 2/2009 | Iwakawa et al. | |
| 2013/0233117 | A1 | 9/2013 | Read et al. | |
| 2014/0116187 | A1 * | 5/2014 | Tinnin | B62D 1/184 74/493 |
| 2014/0246266 | A1 * | 9/2014 | Harada | B62D 1/187 180/443 |
| 2014/0260762 | A1 * | 9/2014 | Streng | B62D 1/195 74/493 |
| 2015/0013493 | A1 * | 1/2015 | Back | B62D 1/195 74/493 |
| 2015/0203145 | A1 * | 7/2015 | Sugiura | B62D 1/189 74/493 |
| 2016/0121919 | A1 * | 5/2016 | Mihara | B62D 1/184 74/493 |
| 2017/0008545 | A1 * | 1/2017 | Hong | B62D 1/183 |

FOREIGN PATENT DOCUMENTS

| | | | | |
|---|---|---|---|---|
| FR | EP 0805092 A1 * | 11/1997 | | B62D 1/184 |
| FR | 2873075 A1 * | 1/2006 | | B60R 25/02153 |
| JP | 2008018876 A | 1/2008 | | |

* cited by examiner

STEERING COLUMN ASSEMBLY WITH TILT ADJUSTMENT AND IMPROVED ASSEMBLY METHOD FOR RESISTING LASH

CLAIM OF BENEFIT OF FILING DATE AND PRIORITY

The present application claims the benefit of the filing date of, and priority to, U.S. Application No. 62/020,077, filed Jul. 2, 2014, which is hereby incorporated by reference in its entirety.

FIELD

In general, the present teachings relate to an improved steering column assembly and methods associated with the same (e.g., methods of assembling a steering column assembly). More particularly, though having aspects making it adaptable to manually adjustable steering column rake adjustment systems, the present teachings are directed mainly at a motorized tilt adjustable steering column system.

BACKGROUND

In the field of automotive vehicles, it has become popular to employ steering column assemblies that include tilt ("rake") and/or telescoping ("reach") functions. Assemblies that employ both tilt and telescoping functions are known also as "rake and reach steering column assemblies." The use of motors to translate a steering wheel relative to a vehicle operator also has seen increased use. It is common to employ motors to perform one or both of the tilt and telescoping functions. For example, one motor may be operated to actuate the steering column assembly generally in an upward or downward vertical direction to adjust the height of a steering wheel relative to an operator of the vehicle and thus perform the tilt function. Another motor may be operated to actuate the steering column assembly to adjust the fore/aft position of the steering wheel relative to the vehicle operator. The latter typically achieves the adjustment by way of translation of a telescopic tubing arrangement by which at least one inner tube associated with the steering wheel translates relative to a shaft for steering.

It also has become more prevalent to employ steering column assemblies that are adapted to mount to a vehicle structure by use of a bracket structure, which may include one or more bracket components, and (in turn) which may be pivotally connected (e.g., at or near its forward end) to a column housing that receives an inner tube. This is a particularly attractive arrangement for use with internally collapsing column assemblies. Such assemblies may employ a bracket structure adapted to affix the assembly to a vehicle structure. A tilt and/or telescope assembly may be pivotally connected to the bracket structure. For instance, it may be connected at or proximate (e.g., within about 50 millimeters, or possibly within about one third of the length of the steering column assembly in its fully telescoped position) a forward end of the assembly, or elsewhere along the length of the assembly. Due to the fact that steering column assemblies are relatively large assemblies, especially when the pivotal connection is at or proximate the forward end, even small differences in dimensional tolerances (e.g., at the pivotal connection location) can result in a relatively large lash effect for the vehicle operator. That is, dimensional tolerance differences from vehicle to vehicle may lead to the potential for some vehicle operators to sense side to side motion of the steering column during steering column adjustment, or possibly even when steering.

One approach proposed to address this phenomena has been the use of a constant thickness side plate that is mounted to a bracket structure (e.g., at a side wall of a bracket structure, such as a top bracket) so that the plate is positioned between the side wall of the top bracket and the column housing. The side wall of the top bracket is generally parallel with the axis of vertical translation of the column working during a tilt adjustment. During installation, the side plate is fitted in a gap between the top bracket and the column housing and is fastened to the top bracket with two or more vertically spaced fasteners. Much trial and error is required during assembly to determine the proper location and position of the side plate so that it will engage the column housing during tilt adjustment, resist lash and not result in too much noise generation from a tilt adjustment motor working to overcome opposing forces as the column housing rubs against the plate during tilt adjustment. This is particularly the case in view of the potential for manufacturing inconsistencies of components, some of which are cast articles and may require one or more machining or finishing steps. To illustrate this approach, reference is made to FIGS. 1A and 1B, which show a portion of a steering column assembly 10, including a top bracket 12 adapted to be pivotally connected to a column housing (not shown) at a forward end 14. The top bracket 12 generally has a planar upper surface 16, and includes a side wall 18 that is perpendicular to the plane of the upper surface. A spacer plate 20 having a forward surface 22 and a parallel rearward surface 24 is located in a space between the top bracket 12 and the column housing. The spacer plate 20 is connected to the side wall 18 of the top bracket 12 by a pair of vertically spaced fastener connectors 26a and 26b that are adapted to be individually adjustable for allowing the spacer plate 20 to be secured to the side wall 18 and adjusted through a series of trial and error adjustments for realizing the appropriate location and spacing of the spacer plate relative to the side wall, while also causing the spacer plate to bear against the column housing for resisting lash over a range of tilt adjustment locations.

As can be appreciated, there are expected to be differing dimensional tolerances from one assembly to another. Further, depending upon the location of the spacer plate relative to the side wall, there may result undesirable noise from an adjustment motor working to overcome opposing forces arising from the column assembly bearing against the spacer plate during tilt adjustment. As a result of the above, it is seen how assembly operations can be potentially complicated and not as efficient as may be desired.

There is a need for an alternative assembly and method of making the assembly that will help to reduce steering column lash effects, that will generate relatively little noise when the tilt function of a steering column assembly is employed, that will apply suitable force to help resist transverse translation of the steering column assembly once an adjustment has been made, that will provide for relatively efficient assembly operations, or any combination thereof.

SUMMARY

The present teachings make use of a simple, yet elegant, construction approach by which relatively few components can be employed for achieving an adjustable steering column assembly (and particularly one that includes a tilt adjustment function), that simplifies manufacture of adjustable steering column assemblies, and that otherwise overcomes one or more of the previously stated problems.

In general, in an aspect of the teachings, there is disclosed a steering column assembly for an automotive vehicle. The steering column assembly includes a column housing having a longitudinal axis. A steering shaft adapted to receive a steering wheel, is supported for rotation (and optionally for telescopic adjustment) in the column housing and has a longitudinal axis that is generally coaxial with the longitudinal axis of the column housing. At least one bracket structure is adapted for mounting the steering column assembly within the automotive vehicle. The at least one bracket structure may include a side wall portion having a surface that has an optionally inclined portion, relative to a generally vertical plane through the longitudinal axis of the column housing. The side wall portion is in generally opposing facing relation with a portion of the column housing. The side wall portion and the column housing are separated by a gap. The column housing is pivotally connected within the automotive vehicle relative to the bracket structure. A tilt subassembly is adapted for selectively raising or lowering the steering shaft and column housing along a generally vertical axis of travel. There is mounted in the gap between the at least one bracket structure and the column housing a spacer that is mountable by a fastener to the at least one bracket structure within the gap; has an exposed contact surface; and is mountable: (1) by a single fastener or more than one fastener so that the exposed contact surface is translatable in a direction for filling any remaining gap between the column housing and the exposed contact surface, wherein the direction is at least partially along an axis generally transverse to the longitudinal axis of the column housing, (2) by a fastener for (a controllingly adjustable) movement of the spacer in at least one axis that is generally parallel (e.g., within about 20°, about 10°, or about 5°) relative to a generally vertical plane through the longitudinal axis of the column housing so that the exposed contact surface is translatable (e.g., by sliding) in a direction for filling any remaining gap between the column housing and the exposed contact surface, or both (1) and (2). The exposed surface of the at least one spacer is in facing relation with at least one portion of the column housing (e.g., a pad on the column housing) and is positioned so that the at least one portion of the column housing (e.g., the pad) slidingly contacts at least a portion of the exposed contact surface when the steering shaft is raised or lowered by way of the tilt subassembly.

In this manner, simplified assembly of the spacer is afforded, such as by allowing for the use of only one fastener, by allowing translation of the spacer generally parallel to the longitudinal axis of the column housing, or both.

Put in another general way, the present teachings make use of a steering column arrangement in which there is included an inner column tube; a steering shaft supported for rotation at least in part by the inner column tube and having a longitudinal axis; at least one bracket structure (e.g., one that includes at least one top bracket) adapted for receiving a least a portion of the steering shaft and for mounting the steering column assembly within the automotive vehicle, the at least one bracket structure may include a side wall portion (which may have an optional inclined surface) that is in generally opposing facing relation with a portion of the steering shaft; a tilt subassembly that is adapted for selectively raising or lowering the steering shaft along a generally vertical axis of travel; a column housing that is pivotally coupled with the at least one bracket structure, is adapted to telescopically receive an inner column tube that rotatably supports the steering shaft, and is adapted to permit steering shaft tilt adjustment by way of a tilt subassembly (e.g., a motor driven tilt subassembly that is adapted to selectively raise or lower the inner column housing); and at least one adjustable (e.g., capable of adjustment in at least one or two axes, such as vertically and/or longitudinally) spacer having an exposed surface, being disposed between the column housing and the at least one bracket structure and being mounted (e.g., by way of a single fastener) to the bracket structure (e.g., to a portion of the side wall (which may be an optionally inclined surface of the side wall)), wherein the exposed surface of the at least one spacer is in facing relation with at least one portion of the column housing and is adjustably positioned so that the at least one portion of the column housing slidingly contacts at least a portion of the exposed surface of the at least one spacer when the steering shaft is raised or lowered by way of the tilt subassembly.

The teachings herein also contemplate methods. For example, the teachings envision a method of assembling a steering column assembly that includes the steps of assembling the column housing and the bracket structure as described above, locating a gap between the side wall of the bracket structure and the column housing, inserting the spacer into the gap to a desired position (which may include sliding the spacer along or relative to an opposing surface of the bracket structure) so that during raising or lowering of the column housing during a tilt operation will result in the column housing contacting the exposed surface of the spacer, and securing the spacer to the bracket structure with a fastener (e.g., a single fastener) to maintain the spacer in the desired position. The securing the spacer step may be performed in a single fastening operation by employing a single fastener. It may be performed by applying a single desired load to a fastener without the need for multiple trial and error adjustments.

As can be seen, it is believed that by employment of the teachings herein it is possible to achieve an effective adjustable steering column system (especially beneficial for assemblies having pivotal connections at a forward end (e.g., having a column housing pivotally connected to a bracket structure, such as for an internally collapsing assembly, though the teachings also may be employed for externally collapsing systems as well)). Particularly as compared with previous systems, the present teachings employ a simplified construction, while still being adaptable to a wide range of dimensional tolerances. The teachings afford an effective approach to resisting steering column lash. They afford a convenient approach to help induce resistance to vertical translation of a tilt adjusted assembly. They also afford an approach that generates relatively little noise. Further they afford a simplified assembly method for manufacturing steering column assemblies.

DETAILED DESCRIPTION

Figure 1A:
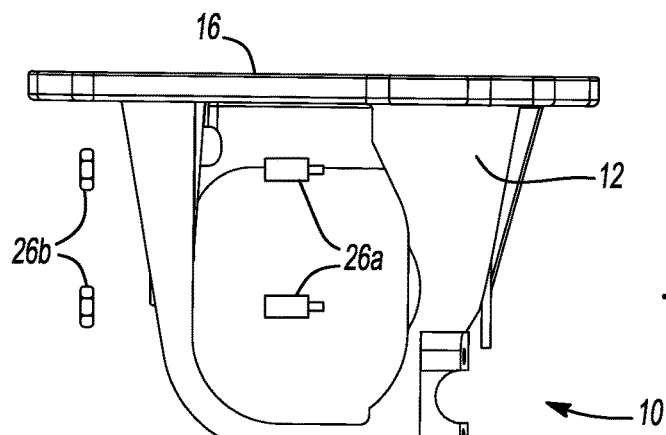
FIG. 1A is a front exploded view of one type of bracket structure for a steering column assembly.
Figure 1B:
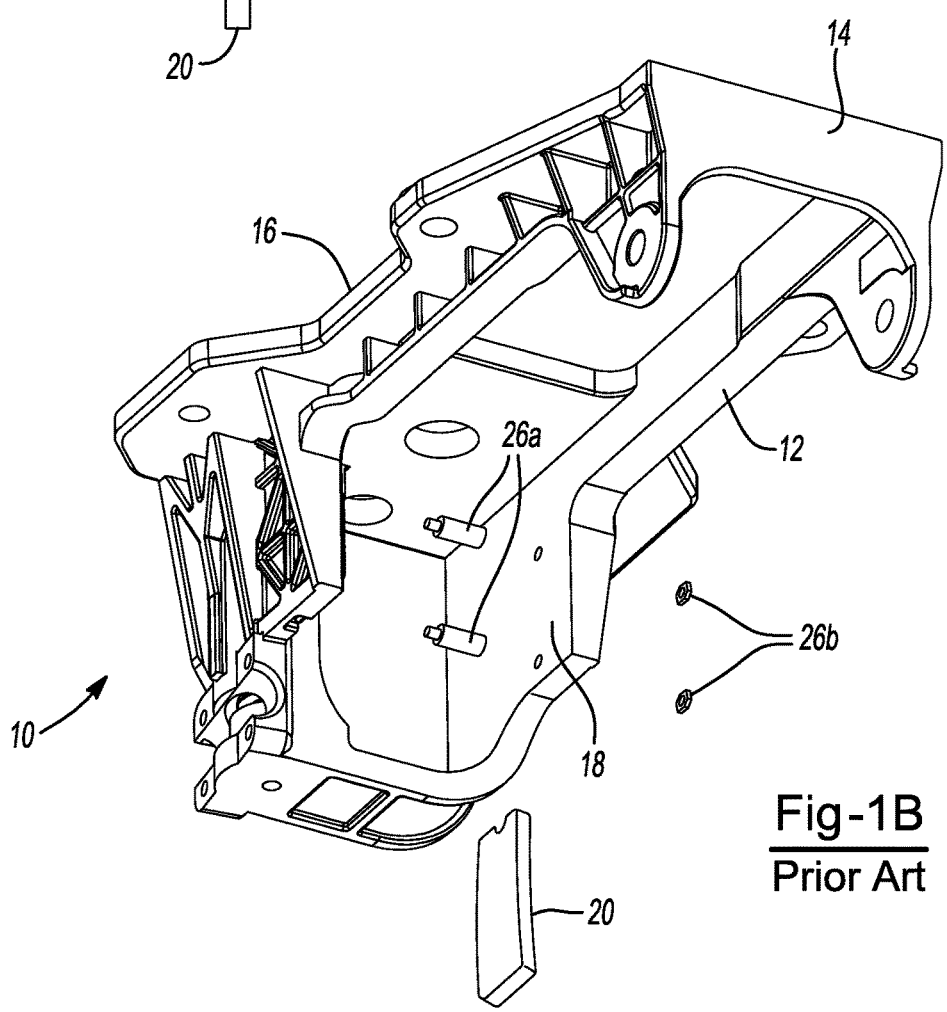
FIG. 1B is a rear exploded perspective view of the bracket structure of FIG. 1A.

As required, detailed embodiments of the present teachings are disclosed herein; however, it is to be understood that the disclosed embodiments are merely exemplary of the teachings that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present teachings. However, relative positions of elements shown in figures as well as geometries are part of generalized teachings even if not explicitly recited.

With more attention now to the details of the assemblies herein, they generally will include a column housing operatively connected with a bracket structure. The column housing operatively supports a steering shaft that is driven by a steering wheel. For this purpose, the column housing may itself be a tube. It may also receive another tube that supports the steering shaft. One such tube, referred to herein an inner column tube, typically will have a hollow cavity along at least a portion of (if not the entirety of) the length of the tube and may be sized and configured to receive and support a rotatable shaft, namely a steering shaft and possibly one or more bearings. Both the shaft and any tube (be it a column housing, an inner column tube, or both) will have a longitudinal axis. When installed in a vehicle, the longitudinal axis of each the shaft and any tube may be generally coaxially aligned, aligned generally parallel with a longitudinal axis of a vehicle (e.g., within about 10° or even about 5°), or each. The shaft, the column housing and any inner tube typically will be made of a suitable metal, such as steel or aluminum. Metal components herein may also be made of other metals, such as magnesium. Such metals typically will be alloys. However, generally pure metals are also possible.

A bracket structure (e.g., one that includes a top bracket) may be employed for receiving and/or supporting at least a portion of the steering shaft (e.g., while the shaft is at least partially contained within the inner column tube, the column housing, or both) and for mounting the steering column assembly within the automotive vehicle. The bracket structure may include a portion, such as an upper plate portion, that is adapted to mount to a vehicle structure (e.g., a cross vehicle beam, an instrument panel, or otherwise) or multiple portions adapted to mount to a vehicle structure. The bracket structure may include a portion that is adapted to support (e.g., pivotally support) a steering shaft (such as by way of an inner column tube telescopically positioned within a column housing). The bracket structure may be fabricated to include multiple structures, a single unitary structure, or a plurality of components assembled together in an assembly to define a desired bracket structure. The bracket structure may be a cast structure (e.g., structure made by casting a mass), a forged structure (e.g., a structure made by forging a metal mass), a machined structure, a consolidated structure (e.g., a structure made by a step of sintering and/or pressing a powder metal mass), or any combination thereof. One preferred approach is to cast the bracket structure to form a metal casting (e.g., an aluminum alloy, magnesium alloy, or a ferrous metal casting). The bracket structure thus may be configured for integrating functions of mounting within a vehicle and accommodating a tilt function of the assembly relative to a vehicle operator. For instance, the functions may be integrated into a single top bracket, or spread among separate bracket components.

The bracket structure may include a plurality of ribs. It may include one or more openings through which a fastener may be passed for attaching the bracket to the vehicle. It may include one or more projections, such as for attaching to the vehicle. The bracket structure may include an upper surface (e.g., an upper surface defined on an upwardly positioned plate portion of the bracket). At least a portion of the upper surface may be adapted to abut against the automotive vehicle structure to which it is attached (for example, for attaching to a generally flat cross vehicle beam, instrument panel or both, which is to be disposed above the bracket structure). The bracket structure may include a generally planar upper surface. The generally planar upper surface may include one or more wells at least partially defined by the ribs that are present. The bracket structure may also include a collar portion that projects away from a lower surface of the bracket structure. The collar portion may be defined to include a completely closed or at least partially enclosed structure. The bracket structure may include one or more (e.g., a pair of) pivotal connection arms. For example, at least one pair of arms may be disposed toward a forward end. The arms may include a portion that extends beyond a forward end of the upper surface. The arms may include one or more openings for receiving a fastener that penetrates through the arm and into a column housing. The column housing may be adapted to slidingly receive the inner column tube. The column housing may also be adapted to provide a connection of a telescoping motor subassembly (e.g., the column housing may have a longitudinal slot to allow sliding of linkage to the inner column tube, relative to the column housing). The bracket structure may also include a housing structure, a flange structure, or both, for receiving a motorized tilt subassembly, a telescoping motor subassembly, an energy absorption device, or any combination thereof. The collar portion may have an asymmetric structure, such as that depicted herein as resembling a capital letter "D", within which one or more components (e.g., a drive member such as a rod) of a motorized tilt subassembly are received. It may also be "u"-shaped or otherwise configured.

The bracket structure may have one or more downwardly projecting side walls. Any such side wall may be part of the collar or separate from the collar. The side wall may include at least one throughhole (e.g., a slot throughhole, such as a generally vertically slot throughhole, a generally horizontally oriented slot throughhole, an angularly oriented slot throughhole, an arcuate throughhole, or any combination thereof), which affords position adjustability for attaching the spacer of the present teachings, such as for receiving and positioning a fastener for the spacer. The side wall may be generally orthogonal relative to the upper surface or the upwardly positioned plate portion of the bracket structure. The side wall may be generally parallel to an axis of vertical travel for tilt operation. The side wall may be configured to receive the spacer, such as by providing a complementary shape into which the spacer can be located. For example, the side wall may include vertically spaced ribs that define a region into which the spacer can be placed. Such ribs are thus able to resist motion of the spacer in the fore or aft direction. At least a portion of the side wall may have the same or a different slope as compared with an adjoining surface of the side wall and/or bracket structure, e.g., a portion of the side wall may have a different slope relative to a portion of the collar that generally encircles the steering shaft.

The teachings contemplate employing at least one telescoping motor subassembly adapted for selectively driving the steering shaft (by way of a rod or other drive member) in a fore or aft direction generally along the longitudinal axis of the steering shaft. The telescoping motor subassembly may include an electric motor that has a motor shaft that operatively drives a drive member (e.g., a rod that is threaded or has gear teeth over at least a portion of its length). The shaft may drive the drive member by use of one or more gears, by way of a threaded nut or otherwise. The motor shaft may have a longitudinal axis that is oriented generally parallel with the longitudinal axis of the steering shaft and/or inner tube. The motor shaft may have a longitudinal axis that is oriented generally transverse with the longitudinal axis of the steering shaft and/or inner tube. The telescoping motor subassembly may be such that it includes a housing within which the motor is at least partially located. The housing may include one or more flat surfaces that are adapted to slidingly bear against another surface (e.g., a bracket, a flange of the column housing, or some other mounting structure), which other surface may be part of, or be operably connected with the column housing. Such flat surfaces may be a part of a mounting structure for securing the telescoping motor subassembly to the overall assembly. A manually adjustable telescoping assembly may also be employed in the alternative.

The teachings further contemplate employing at least one tilt subassembly that is adapted for selectively raising or lowering the steering shaft. The tilt subassembly may be manually actuated, motorized, or both. It may be attached (e.g., at a first mount location along its length) to the bracket structure. For example, as discussed, it may be incorporated within a housing structure defined in the bracket structure. It may be attached at a second location along its length (e.g., at a second mount location that is distal from the upper surface of the bracket structure as compared with the first mount location).

As indicated, a column housing may be pivotally coupled with the bracket structure, such as by way of a pivotal coupling with a top bracket (e.g., at or proximate a forward end of both the bracket structure (e.g., a top bracket) and the column housing) and is adapted to permit steering shaft adjustment (e.g., tilt adjustment, telescopic adjustment, or both, such as by way of the tilt subassembly, the telescoping motor subassembly, or both). The column housing may be a cast structure (e.g., a structure made by casting a mass), a forged structure (e.g., a structure made by forging a metal mass), a machined structure, a consolidated structure (e.g., a structure made by a step of sintering and/or pressing a powder metal mass) or any combination thereof. It may have a generally cylindrical shape along at least a portion of its length, such as a rearward portion. It may include one or more planar portions along a side that opposes the side wall of the bracket structure. One preferred approach is to cast the column housing to form an aluminum alloy casting. The column housing may include one or more ribs. It may include a structure (e.g., along a side of the housing so that it projects generally radially outward relative to a longitudinal axis of the housing) onto which an energy absorption device of the teachings of U.S. Publication No. 20130233117 (incorporated by reference; see, e.g., FIGS. 1A-5 and associated discussion of those drawings) may be secured, or into which an energy absorption device of the teachings herein may be positioned. A space will typically be defined between the column housing and the bracket structure (e.g., between the column housing and the downwardly projecting side wall of the bracket structure), such as at a location toward the rearward end of the assembly.

For example, the column housing may be generally elongated. It may have a substantially cylindrical configuration over at least a portion of length. It may have a lower portion that has laterally projecting flanges over at least a portion of the column housing length. The flanges may project from both sides of the column housing. The flanges may project laterally outward to a location that extends beyond the outermost reach of the wall from which it projects. The column housing may have one or more openings, e.g., slots, in a lower portion for exposing the inner column tube so that the column tube can be connected with and translate longitudinally with a drive member (e.g., via a suitable bracket) associated with a telescoping motor subassembly. Because the column housing is pivotally connected to the bracket structure (e.g., at or proximate a forward end of the assembly), in the event of a secondary collision, the column housing can remain generally fixed in its normal operational position. Internal collapse may occur by the inner tube moving forward and causing the telescoping motor subassembly to become detached and energy to be absorbed by energy absorption devices that connect the column housing to the telescoping motor subassembly.

The column housing may include a generally planar contact portion or "pad". Such contact portion may be located at an intermediate location along the length of the column housing, or adjoining one of the ends. The contact portion may be positioned generally opposite the spacer of the present teachings. The contact portion can bear against the spacer after appropriate adjustment of the spacer, and fixation of the spacer is secured in place.

The teachings thus contemplate further employing a telescoping motor subassembly mounting structure that is coupled during normal operation to the column housing, the telescoping motor subassembly and the inner column tube. The telescoping motor subassembly mounting structure may be adapted to detach from the column housing in the event of an impact exceeding a predetermined first impact load, in accordance with the teachings in of U.S. Publication No. 20130233117 (incorporated by reference). The telescoping motor subassembly mounting structure and/or a motor may be located beneath the column housing. As the telescoping motor subassembly mounting structure detaches from the column housing, it may translate along the underside of the column housing. Thus, the telescoping motor subassembly mounting structure may be adapted to connect with an energy absorption device element and cause the element to plastically deform following an initial breakaway.

The teachings herein also contemplate methods of making and/or installing the assemblies described. Thus, the elements as described may be assembled in a manner to achieve the described assembly. The teachings envision providing an assembly as described herein for installation into an automotive vehicle. For example, the teachings include attaching the bracket structure to a cross-vehicle beam, to an instrument panel, or both. Such attaching may be for positioning the described bracket structure (e.g., top bracket) above or below the cross-vehicle beam and/or the instrument panel. The teachings envision providing for installation into an automotive vehicle (e.g., by attaching to a cross-vehicle beam, an instrument panel, or both) an assembly in accordance with the present teachings.

In a particular aspect, the present teachings employ at least one spacer that when assembled into a steering column assembly will result in a sloping surface and/or a parallel surface relative to an opposing surface (e.g., the contact portion) of an opposing column housing. This can be achieved by either or both of employing a spacer that is adapted to attach to (e.g., abut against) a substantially orthogonally oriented side wall (which side wall may be configured to receive the spacer, such as by a complementary structure) that projects from a bracket structure; or employing a plate of generally constant thickness that is adapted to attach to a side wall of the bracket structure that has a generally inclined surface. It is also possible that the column housing may itself have a generally planar face configured for achieving the opposing sloping surface arrangement.

A construction of the spacer may include a single throughhole or a plurality of throughholes to allow fasteners (e.g., a bolt, a pin, a push nut, or otherwise, any of which may be threaded) to attach the spacer to the side wall. Though, by virtue of the structure of the spacer of present teachings, it is possible that there will be only a single throughhole that receives a single fastener to attach the spacer to the side wall. For example, it is possible to employ a threaded bolt without a corresponding nut or other mating hardware, except as is formed integral in the spacer (e.g., by way of a threaded opening in the spacer). At least a portion of the spacer may be in contact with the side wall. It is possible also that the spacer may be formed (e.g., integrally) to include a male portion of a fastener (e.g., of a type as described above), which can be secured through the side wall to an opposing female fastener (e.g., a threaded nut). Any throughhole of the spacer may be circular, elongated, or any combination thereof. Thus it is possible that the throughhole in the side wall of the bracket structure will be elongated (e.g., a throughhole slot with one or more straight and/or arcuate portions), and the throughhole of the spacer may be circular. It is possible that the throughhole in the side wall of the bracket structure will be circular, and the throughhole of the spacer may be elongated (e.g., a throughhole slot with one or more straight and/or arcuate portions). A combination of each may be employed.

The forward face of the spacer may thus have an exposed surface. For example, a portion of the spacer may be in line contact, plane contact, or both with the side wall. Such contact may be along one or more free ends of the spacer formed generally along one or more edges of the spacer, at an interior of the spacer, or both.

Such spacer may be disposed in the space between the column housing and the at least one bracket structure. The resulting exposed surface of the at least one spacer (whether from a wedge structure, from attachment to an inclined surface, from a surface of the column housing, or any combination thereof) may be in facing relation with at least one portion of the column housing. The spacer may be positioned so that the at least one portion of the column housing bears against at least a portion of the exposed surface when the steering shaft is raised or lowered by way of the tilt subassembly. In this manner, the spacer is able to apply at least the sufficiently high lateral force against the column housing for helping to resist lash of the steering column assembly when it is mounted in the vehicle and in operation. By virtue of the arrangement, such lateral force can be maintained over at least a majority if not substantially all of the vertical travel of column housing during tilt operations. Further, the lateral force may be sufficiently high to help a steering column assembly resist becoming dislocated from its adjusted position.

The spacer may be oriented relative to a vertical axis of travel from a tilt operation in a generally parallel relationship (as will be depicted in the example of the accompanying drawings), in a generally perpendicular orientation, or at an angle that is somewhere between a generally parallel or generally perpendicular orientation.

The spacer may be made of a metal. For example it may be a relatively low carbon content plain carbon steel (e.g., SAE 1008 steel). It may be a stamped part. It may include a forward face (e.g., a face that defines an exposed surface) and a rearward face. The forward face and the rearward face may have generally the same shape. The forward face and the rearward face may be generally parallel. Thus, it may have a generally constant wall thickness. It may have sufficient elasticity so that over the range of vertical travel of the column housing, the spacer will laterally deform plastically, but not so much that it will prevent any travel during tilt or that it will cause undesired noise levels.

The spacer may include edges that define an arc-shape, a linear-shape, or any combination thereof. The faces may be configured as quadrilaterals (e.g., a generally rectangular shape). For example, it may have at least one or two opposing parallel edges. The material at the edges may be rolled over the edge to define a radiused rearwardly facing free end structure. The free end structure may be generally continuous about the periphery of the spacer. However, it may include one or more gaps about the periphery. The rearwardly facing free end structure may be generally coplanar about a majority of the periphery, or even about substantially the entirety of the periphery. The rearwardly facing free end structure may itself include a rolled edge. The terminal portion of the material may face toward the rear of the spacer. The spacer may include one or more throughholes adapted to receive a fastener to secure to the bracket structure. The throughholes may be defined by material that is deformed to define an open or enclosed ring (e.g., a substantially annular open or closed ring) that projects to the rear of the spacer. The ring may terminate at a location that does not extend beyond the most rearwardly facing free end. In this manner the ring may be able to assist in resisting and opposing forces applied against the spacer and will help to maintain the forward face at a desired distance from the structure to which it is attached.

The inclined surface of the side wall of the bracket structure may be generally inclined relative to the axis of vertical travel of the column housing of the steering column assembly when the column housing is raised or lowered. The slope of the forward face of the spacer may likewise have such an incline. For instance, relative to the axis of vertical travel (A) the inclined surface of the side wall may be at one or more angles relative to (and not parallel to) the axis of vertical travel. For example, it may be at an angle ($\alpha$) that is less than about 20°, 15°, 10°, 5° (e.g., about 2°), but greater than 0°.

The spacer may have a length (L), a width (W), a maximum thickness ($T_{max}$) (e.g., toward a first end of the spacer) and a minimum thickness ($T_{min}$) (e.g., toward a second end of the spacer). The spacer may be configured generally as a wedge.

For a spacer that is adapted to be secured to an inclined surface of a bracket structure side wall, it is possible that the spacer may have a generally constant thickness from along its length over the portion of the spacer length over which the column housing may travel during tilt adjustment. It is also contemplated that a spacer may be configured as a wedge, which has a varying thickness along its length over the portion of the spacer length over which the column housing may travel during tilt adjustment. For instance, such a wedge for the spacer may have a ratio of the maximum thickness to the minimum thickness may be about 1.5:1 to about 1.05:1 (e.g., about 1.1:1). The ratio of the length to the width may be about 4:1 to about 1.2:1, about 3:1 to about 1.5:1 (e.g., about 2:1). The spacer may have multiple widths and multiple lengths. The above ratios thus contemplate an average of widths along the length(s) and/or an average of lengths along the width(s).

It is also contemplated that there may be one or more throughholes (which may be elongated and/or threaded) in the spacer for receiving a fastener to attach the spacer to the steering column assembly (e.g., at a side wall of the bracket structure). It is possible that there may be only a single throughhole, so that attachment of the spacer to the side wall is by way of only a single fastener. In this manner, installation of the spacer in a steering column assembly can be simplified.

The throughhole may be located generally along a centerline ($CL_L$) of the spacer in the length dimension. It may be located in an offset relation to a centerline ($CL_W$) of the spacer in the width dimension. For example, the throughhole may be located between the centerline of the spacer in the width dimension and the first or second end of the spacer. The throughhole may be located at a position that is about ¼ to about ½ (e.g., about ⅓) the distance from the first end (e.g., bottom end) or the second end (e.g., top end).

As indicated, when assembled into a steering column assembly, the spacer will oppose the column housing. It will be typically be dimensioned and/or located so that over at least 25 percent, 50 percent, or even 75 percent of its length (e.g., substantially the entirety of its length), it will be in contact with the inner column housing (e.g., against an opposing at least partially planar surface or "pad" on the column housing) as the inner column housing is raised or lowered. For instance, the spacer may be dimensioned and/or located so that such contact is achieved over at least 50 percent, 75 percent or even about 100 percent of the range of tilt height adjustment at the contact location of the column housing. Thus, if a column housing of a steering column assembly is configured to raise or lower over a tilt height adjustment range of about 50 mm, then there may be contact with the column housing for a distance of at least about 25 mm, about 38 mm, or even about 50 mm.

Due to the incline of one or both of the side walls of the bracket structure or the spacer, and by use of an elongated slot (in either or both of the bracket structure (e.g., the side wall or upper plate portion) or the spacer) for attaching the spacer to the bracket structure it is possible during assembly of the column housing to the bracket structure to make simplified adjustments for achieving the desired position of the spacer relative to the column housing (e.g., relative to an opposing contact surface or pad of the column housing). For instance, by moving the spacer relative to the side wall (e.g., along an inclined surface of the spacer, the side wall, or both) the distance of the exposed surface of the spacer relative to the side wall can be increased or decreased, thereby closing or opening any space needed to accommodate the contact surface of the column housing. Further, by virtue of a single fastener attachment made possible by the present teachings, a single fastening step can be performed, simply by determining the appropriate desired location of the exposed surface relative to the side wall for the steering column assembly being made, and tightening the fastener to an appropriate load state (e.g., to a suitable or predetermined torque level). For instance, the spacer may be secured in a desired pre-loaded state for achieving the appropriate level of resistance relative to the column housing. One or more springs may be employed as well for helping to establish the desired pre-load state.

The teachings also contemplate that the steering column assembly includes an energy absorption structure that is adapted to help manage energy that arises in the event of a secondary impact during a vehicle collision.

By way of illustration, without limitation, the steering column assembly of the present teachings may include structures as disclosed in U.S. Publication No. 20130233117 (Ser. No. 13/788,637; Read and Martinez), incorporated by reference.

Such a steering column assembly may include a bracket structure such as a top bracket (typically made of metal, such as aluminum, which may be cast) adapted for attaching to a structure (e.g., a cross car beam, instrument panel, or both) of an automotive vehicle. A displaceable inner tube is configured to receive a steering shaft. A telescoping actuator device (which may be a part of a telescoping motor assembly), such as an electric motor, is operatively attached to the housing and to the inner tube by way of one or more drive members (e.g., a rod) in a manner that allows the inner tube to be actuated selectively in a fore or aft direction by a vehicle operator. The assembly is also such that it allows the telescoping motor assembly to break away from its attachment to the housing, in a controlled manner using one or more energy absorption device elements, which elements may be selected on the basis of a particular vehicle application, and may be designed for varying or tuning the desired response (e.g., timing of detachment and/or plastic deformation during a collapse stroke). During a secondary impact event, the force of the impact by the vehicle operator is thus transmitted through by the steering shaft to the inner tube and the drive member, causing initial disengagement of the telescoping motor assembly. Additional energy from the impact is absorbed by one or more energy absorption elements that are situated relative to (e.g., operatively between) the telescoping motor assembly and the inner tube, the housing, or both. The one or more energy absorption device elements may be configured (e.g., as a generally folded and relatively thin elongated metallic strip or bend plate that is capable of plastically deforming) and the material selected (e.g., a plain carbon steel, a steel alloyed with one or more other metals, or some other steel or metal) so that they plastically deform to absorb impact energy. Such plastic deformation may be deformation in the absence of elongation; thus it is possible that the metallic strip or bend plate will be folded upon itself and be constrained so that it either gets pulled around an edge of a structure (e.g., a flange, such as a flange associated with the inner column housing) or pushed against a wall for causing the deformation. In this manner, it may be possible to achieve a load and displacement relationship that may include a first stage, in which as load increases displacement increases to a peak displacement corresponding with initial disengagement of the telescoping motor assembly. In a following stage, after a possible energy absorption load delay (which delay may be selectively adjusted by the shape, size, or other characteristic of the energy absorption device elements), reliance upon the one or more energy absorption device elements occurs as energy from the load is primarily absorbed by way of deformation (including plastic deformation) of the energy absorption device elements.

The teachings herein also envision a method of assembling a steering column assembly (e.g. the assembly above described). The method may include steps of positioning an inner tube, which carries or is adapted to receive a steering shaft, within a column housing having a forward end and a rearward end, and having an outer wall and a longitudinal axis (e.g., the outer wall may be generally arcuate, such that the column housing has a generally hollow cylindrical structure over some or all of its length). The column housing may be pivotally connected to a bracket structure such as a top bracket (e.g., at or proximate a forward end of each of the column housing and the bracket structure). The connection is such that the bracket structure, which may include a side wall portion (e.g., a side wall that is generally parallel to the axis of travel of the column housing during tilt adjustment, or that is generally inclined relative to such axis of travel) may be generally laterally spaced from the outer wall of the column housing by a gap. A spacer may be inserted into the region where the gap is intended, e.g., as above described. The spacer may be attached to the bracket structure (e.g., to the side wall or the upper plate portion) so that at least a portion of the forward surface, and namely the exposed face (e.g., at least about 20 or 40 percent of the total area of the exposed face) of the spacer relative to a vertical plane taken through the longitudinal axis of the column housing longitudinal axis is in an inclined opposing relationship. The spacer may be attached to the bracket structure (e.g., to the side wall or the upper plate portion) so that at least a portion of the forward surface, and namely the exposed face (e.g., at least about 20 percent of the total area of the exposed face) of the spacer relative to a vertical plane taken through the longitudinal axis of the column housing longitudinal axis is in a generally parallel opposing relationship. The spacer may be attached to the bracket structure (e.g., to the side wall or the upper plate portion) so that the spacer contacts the outer wall of the column housing (e.g., via a pad) during vertical travel of the column housing in a tilt adjustment, as described herein. The spacer may be attached to the bracket structure (e.g., to the side wall or the upper plate portion) by a single fastener. The spacer may be attached to the bracket structure (e.g., to the side wall or the upper plate portion) in a single attachment step that employs tightening the spacer against the bracket structure (e.g., to the side wall or the upper plate portion) applying a predetermined load (e.g., to a previously established torque amount for a threaded fastener). The spacer may be attached to the bracket structure (e.g., into a threaded opening in the side wall or the upper plate portion, which may be a threaded throughhole) in the absence of multiple adjustments for improving the position of the forward face of the spacer relative to the outer wall of the column housing. It may be attached by use of a threaded fastener bolt into a throughhole (which optionally may be threaded), in the absence of a mating nut. The spacer may function in a manner so that when it contacts the column housing (e.g., via a pad of the column housing), it will apply a force against the column housing for resisting lash of the column housing, for helping to secure the column housing in a selected rake position, or both.

As gleaned from the above, it is seen that there may be mounted in the gap between the at least one bracket structure and the column housing a spacer that is mountable by a fastener to the at least one bracket structure within the gap; has an exposed contact surface; and is mountable: (1) by a single fastener so that the exposed contact surface is translatable in a direction for filling any remaining gap between the column housing and the exposed contact surface, wherein the direction is at least partially along an axis generally transverse to the longitudinal axis of the column housing, (2) by a fastener for allowing (a controllingly adjustable) movement of the spacer in at least one axis that is generally parallel to a generally vertical plane through the longitudinal axis of the column housing so that the exposed contact surface is translatable (e.g., by sliding) in a direction for filling any remaining gap between the column housing and the exposed contact surface, or both (1) and (2).

Referring now to the drawing figures, FIGS. 1A-5 illustrate examples of the structure and operation of an electric reach and rake steering column assembly for a vehicle in accordance with the present teachings. Though shown as an internal collapsing system, the teachings find application for other collapse modes (e.g., external collapsing) as well. The assembly has a tilt adjustment feature and a telescopic adjustment feature. As to each such feature, there are associated motors. However, it is possible that one of the motors may be omitted (e.g., it is possible that the tilt adjustment is achieved manually without a motor, such as by using a lever or other user-operated mechanism).

Figure 2A:
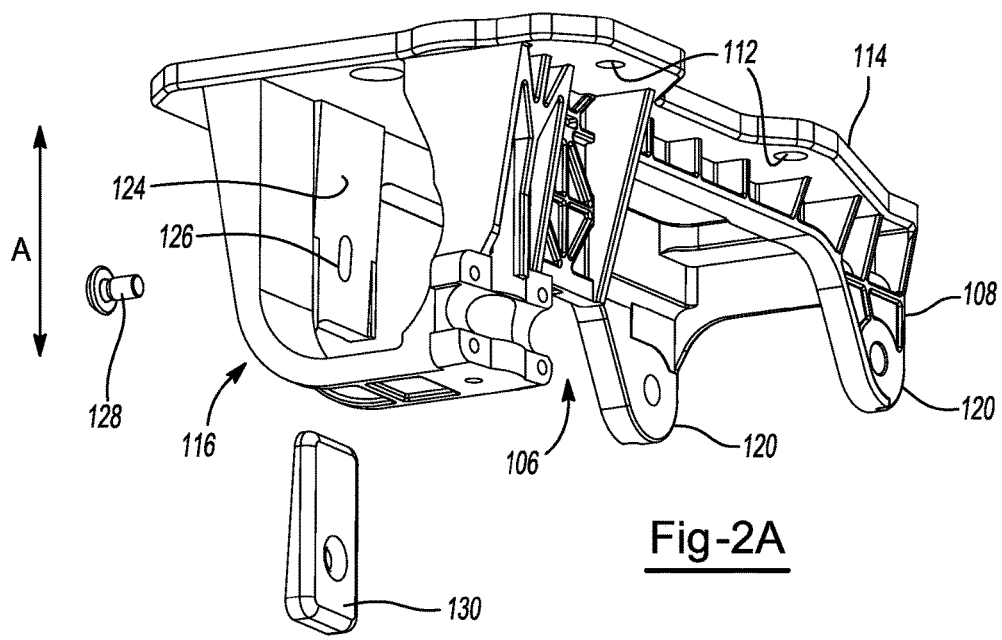
FIG. 2A is a front exploded perspective view of a bracket structure of a steering column assembly of the present teachings.
Figure 2B:
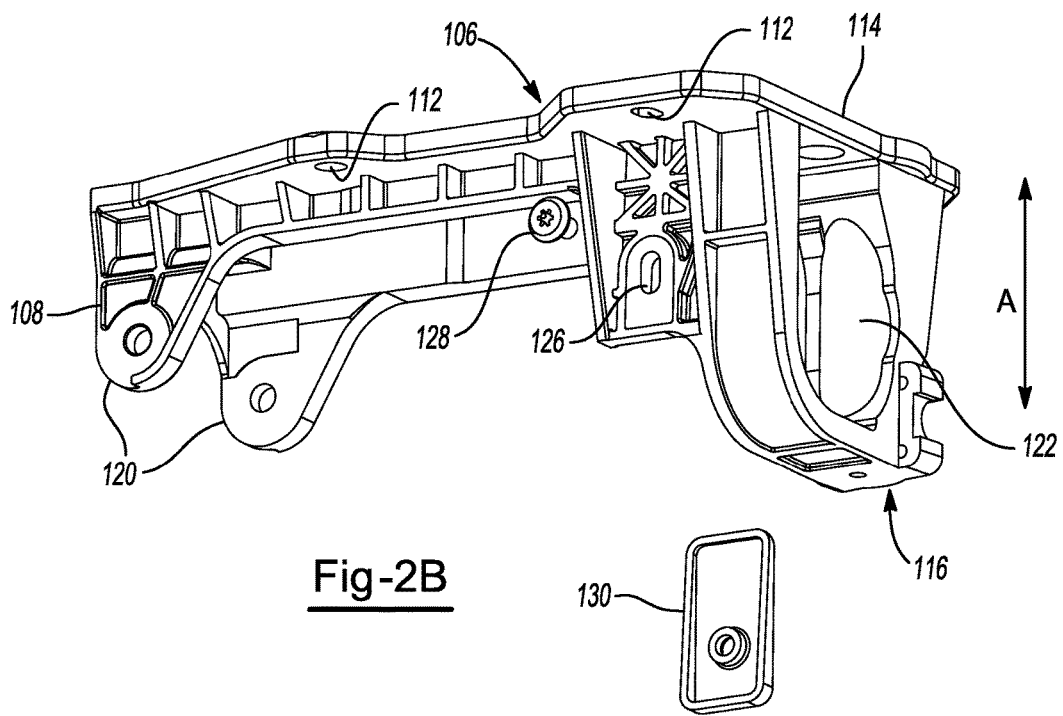
FIG. 2B is another front exploded view of the bracket structure of a steering column assembly of the present teachings of FIG. 2A.
Figure 2C:
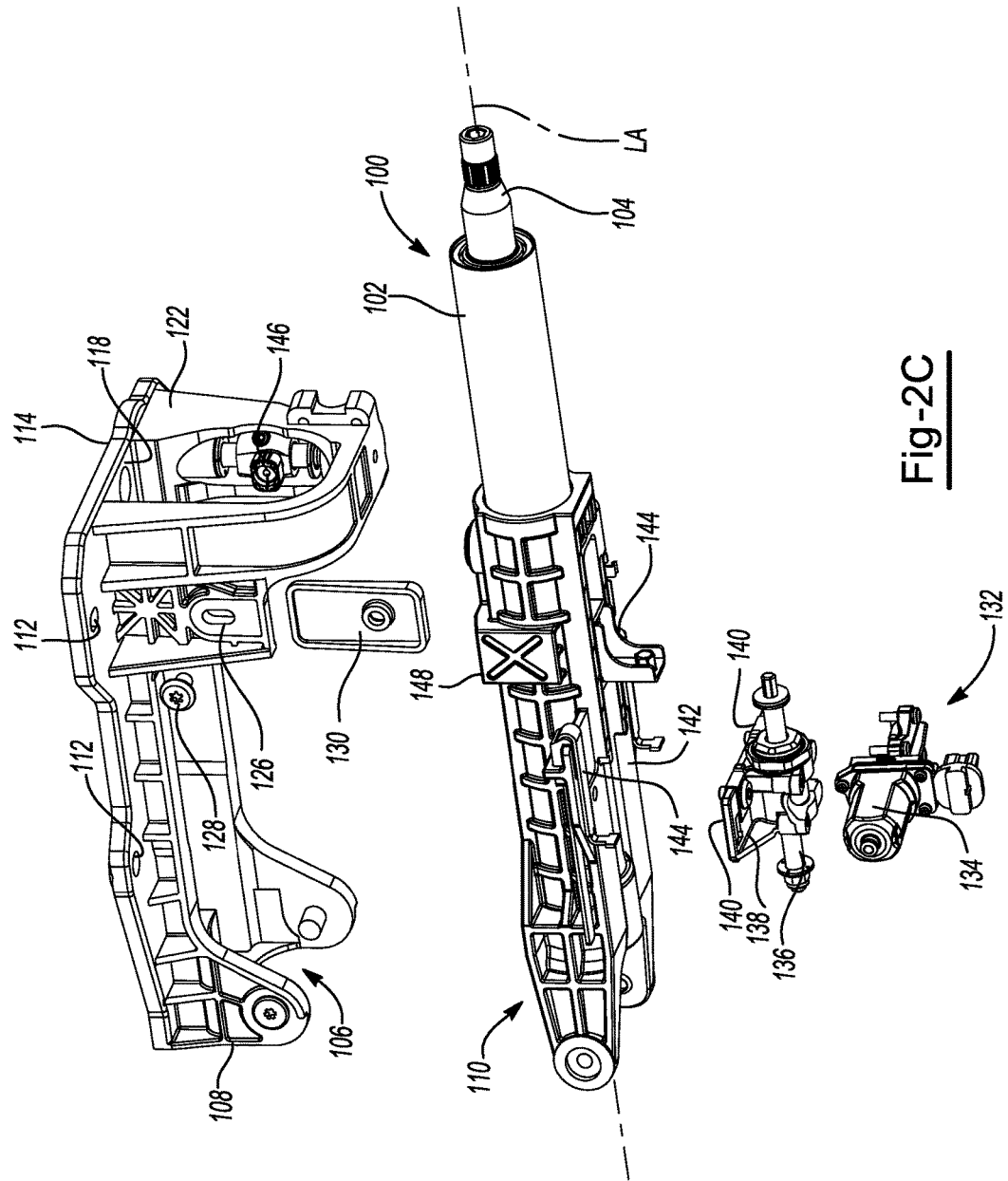
FIG. 2C is a front exploded perspective view of a steering column assembly of the present teachings.
Figure 3A:
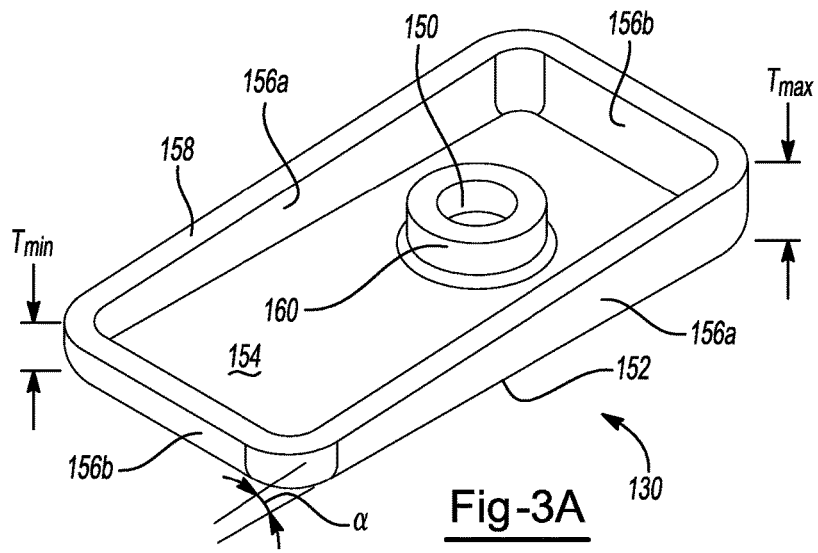
FIG. 3A is a perspective view of one illustrative spacer in accordance with the present teachings.
Figure 3B:
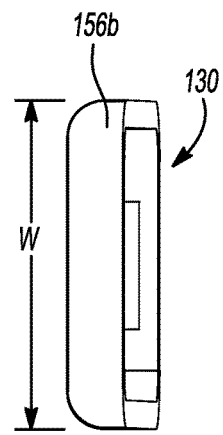
FIG. 3B is an end view of the spacer of FIG. 3A.
Figure 3C:
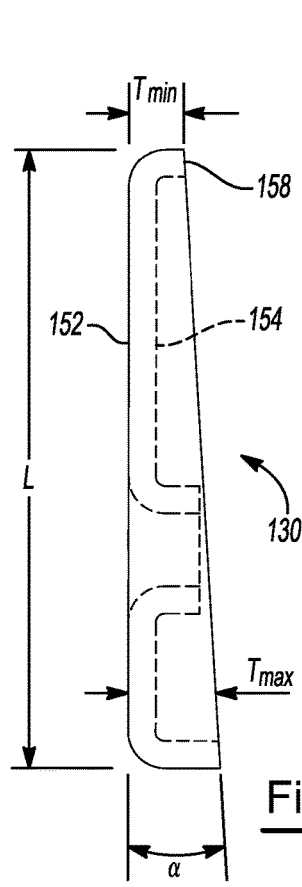
FIG. 3C is a side view of the spacer of FIG. 3A.
Figure 3D:
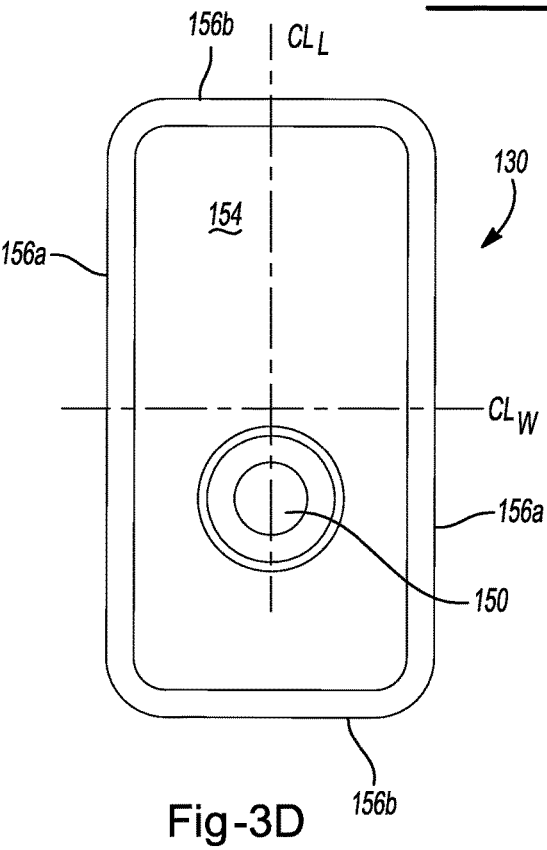
FIG. 3D is a rear view of the spacer of FIG. 3A.

Turning now to FIGS. 2A-2C, there is seen a steering column assembly 100, including a tube 102 that is operatively connected with a steering wheel (not shown), e.g., via a steering shaft 104 (e.g., see FIG. 2C). Both the shaft and the tube have a longitudinal axis (LA). When installed in a vehicle, the longitudinal axis of each the shaft and the tube may be generally coaxially aligned, aligned generally parallel with a longitudinal axis of a vehicle, or each.

A bracket structure, depicted for this illustrative embodiment as a top bracket 106, has a forward end 108 adapted to be pivotally connected with a column housing 110. The top bracket is configured for receiving a least a portion of the steering shaft 104 and for mounting the steering column assembly within the automotive vehicle. The top bracket as shown is configured for integrating functions of mounting within a vehicle and accommodating a tilt function of the assembly relative to a vehicle operator.

The top bracket 106 includes openings 112 through which fasteners (not shown) are passed for attaching the bracket to the vehicle. The top bracket has an upper surface 114 (e.g., an upper generally planar surface defined on an upwardly positioned plate portion of the bracket). The top bracket 106 includes a collar portion 116 toward its rearward end that projects away from a lower surface 118 of the top bracket. The collar portion 116 is depicted to include a completely closed ring-like structure. The top bracket includes a pair of pivotal connection arms 120. For example, at least one pair of arms may be disposed generally at the forward end 108 of the top bracket. The top bracket may also include a structure 122 adapted for receiving a motorized tilt subassembly.

The top bracket 106 has a downwardly projecting side wall 124 (which is shown to have a pair of generally vertically oriented spaced ribs). It is depicted in FIGS. 2A-2C as being generally parallel to the longitudinal axis of the steering shaft. The side wall includes a throughhole 126 (shown as an elongated generally vertical slot) for receiving a fastener 128. The side wall 124 is generally orthogonal relative to the upper surface 114 (e.g., the upper surface of the upwardly positioned plate portion of the top bracket), and is thus generally parallel with the axis of vertical travel (A) of the column housing of the steering column assembly during tilt adjustment. As shown in FIGS. 2A-2C, a longitudinal axis of the fastener 128 is oriented generally parallel with the upper surface 114. In this manner the fastener attaches to a spacer 130 through the side wall 124. However, it is possible that the fastener is attached through the upper surface (e.g., a fastener penetrates through the upwardly positioned plate portion of the top bracket and connects to the spacer from the top of the spacer or via a bracket connected to the spacer). The fastener is shown as penetrating the throughhole 126 laterally from external of the assembly. It thus can threadingly engage the spacer 130.

For the example shown, consistent with the teachings of U.S. Publication No. 20130233117, FIGS. 4a-4c and 5-6, and associated descriptions, incorporated by reference herein, the teachings contemplate employing a telescoping motor subassembly 132 adapted for selectively driving the steering shaft (by way of a rod or other drive member) in a fore or aft direction generally along the longitudinal axis of the steering shaft. The telescoping motor subassembly includes an electric motor 134 that operatively drives a drive member 136. The telescoping motor subassembly may be such that it is at least partially carried by a support structure 138 that has flat surfaces 140 that are adapted to slidingly bear against another a flange structure 142 of the column housing 110. An energy absorbing member 144 (or a plurality of energy absorbing members) such as a metal strip may operatively couple the telescoping motor subassembly with the column housing for absorbing energy in the event of a secondary collision. For example, the member 144 may be configured so that if the telescoping motor subassembly 132 detaches and travels in a forward direction it will cause the energy absorbing member 144 to deform (such as by being folded against or relative to the flange structure 142) and thereby absorb energy from the collision. A manually adjustable telescoping assembly may also be employed in the alternative.

The teachings further contemplate employing at least one tilt subassembly 146 that is adapted for selectively raising or lowering the steering shaft (e.g., via the operatively engaging column housing and/or the inner column tube). The tilt subassembly is shown as being motorized and mounted to the top bracket within the housing structure 122 defined in the top bracket 106.

As indicated, the column housing 110 is pivotally coupled with the top bracket (e.g., toward a forward end of both the top bracket and the column housing) and is adapted to permit steering shaft adjustment. The column housing is shown as a cast structure (e.g., a structure made by casting a mass). A space is defined between the column housing and the top bracket, and specifically between the column housing and the downwardly projecting side wall 124 of the top bracket.

The column housing is shown as being generally elongated and having a substantially cylindrical portion. The column housing 110 is shown as including a contact portion or "pad" 148 at an intermediate location along the length of the column housing (e.g., toward a rearward end of the column housing). The pad 148 is positioned generally opposite a spacer 130 of the present teachings that is secured by way of the fastener 128 to the side wall 124.

With reference more particularly to FIGS. 3A-3D, there is seen an example of one possible spacer 130 in accordance with the present teachings. It is shown generally as a wedge-shaped structure, having a generally rectangular structure in frontal view with a throughhole 150 (which may be threaded for threadingly engaging a fastener) defined in it. The spacer has a forward face 152 and a rearward face 154. The spacer is mounted in the steering column assembly so that the forward face 152 is generally exposed opposite the column housing 110, and particularly the pad 148 of the column housing.

The spacer has two opposing parallel edges 156a and 156b. The material at the edges is rolled over the edge to define a radiused rearwardly facing free end structure, shown as being generally continuous about the periphery of the spacer. The spacer has a single throughhole 150 adapted to receive a fastener to secure to the top bracket. The throughhole 150 is defined by material that is deformed to define an enclosed ring 160. The ring terminates at a location that does not extend beyond the most rearwardly facing free end structure 158.

As seen (such as in FIGS. 4A and 4B), such spacer is disposed in the space between the column housing and the top bracket. The resulting sloping surface of the spacer is in facing relation with the contact portion of the column housing 110. It is positioned so that the contact portion of the column housing bears against at least a portion of the sloping surface when the steering shaft is raised or lowered by way of the tilt subassembly. In this manner, the spacer is able to apply a lateral force to against the column housing for helping to resist lash of the steering column assembly when it is mounted in the vehicle and in operation.

If positioned so that the free end structure 158 was vertically upright, the slope of the forward face of the spacer relative to the axis of vertical travel (A) would be at an angle ($\alpha$), which may be less than about 10°, such as an angle of about 2°. Because the side wall 124 of the top bracket itself has a similar angle, the exposed surface can be generally parallel with the axis of vertical travel. However, any other angle can be employed for the side wall and/or the exposed surface, which would have the exposed surface generally in a common plane with the pad of the column housing. Thus, it is possible that the forward face of the spacer may be inclined relative to the axis of vertical travel of the column housing of the steering column assembly when the column housing is raised or lowered.

The spacer has a length (L), a width (W), a maximum thickness ($T_{max}$) (e.g., toward a first end of the spacer) and a minimum thickness ($T_{min}$) (e.g., toward a second end of the spacer). The ratio of the length to the width is about 2:1.

The throughhole may is located generally along a centerline ($CL_L$) of the spacer in the length dimension. It may be located in an offset relation to a centerline ($CL_W$) of the spacer in the width dimension. For example, the throughhole may be located between the centerline of the spacer in the width dimension and the first or second end of the spacer. The throughhole may be located at a position that is about ⅓ the distance from the opposing edges 156b.

Figure 4A:
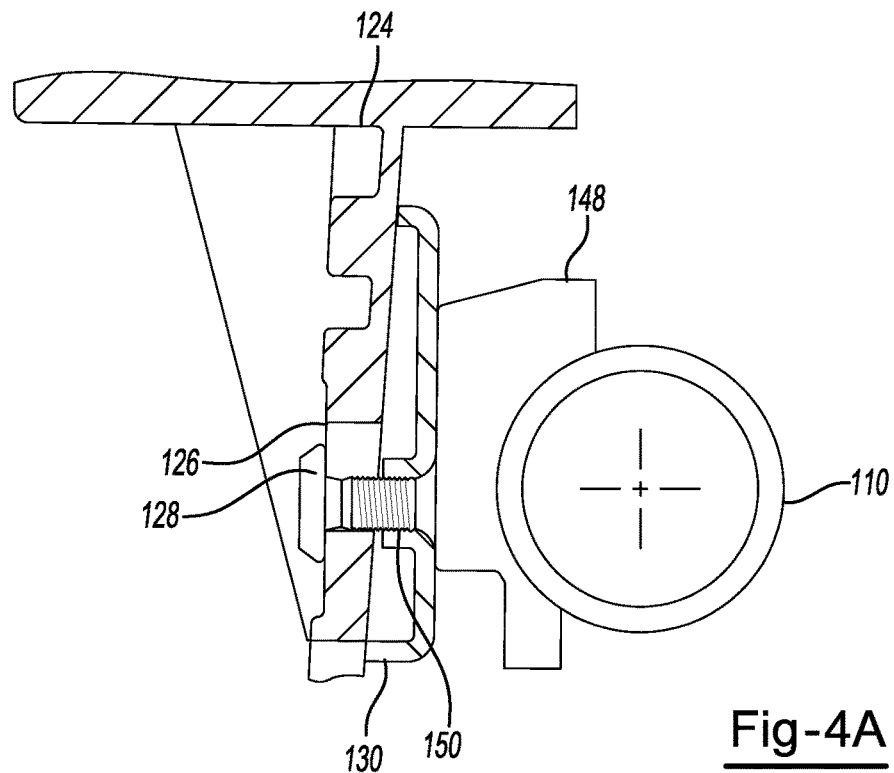
FIGS. 4A and 4B are sectional views to illustrate examples of how the structures herein can accommodate different steering column assembly dimensional tolerances.
Figure 4B:
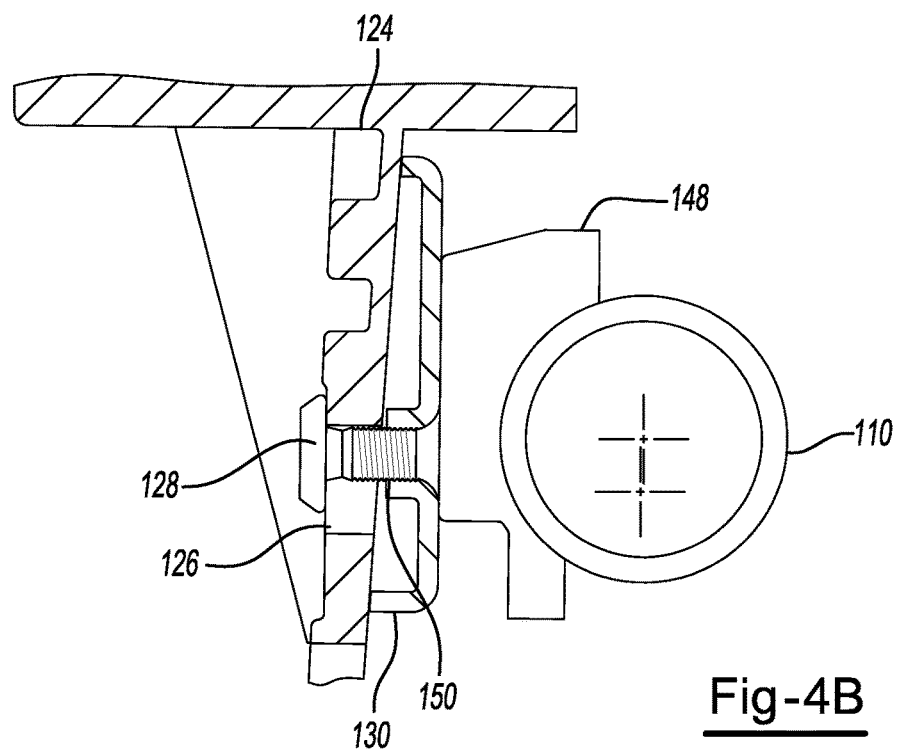

FIGS. 4A and 4B illustrate how the teachings herein can be employed for accommodating the assembly of plural steering column assemblies, each having different dimensional tolerances. Features of the structures are exaggerated for purposes of illustration. In FIG. 4A, the space between a pad 148 of the column housing 110 and the side wall 124 is larger than the corresponding space in FIG. 4B. Thus, the spacer 130 of FIG. 4B is adjusted (by raising it via the throughhole 126) and secured to the side wall 124 (with a fastener 128 via throughhole 150) relative to that of FIG. 4A in a different position for reducing the spacing.

It is thus seen, for instance, that by moving the spacer 130 relative to the side wall 124, the distance of the exposed surface of the spacer relative to the side wall can be increased or decreased, thereby closing or opening any space needed to accommodate the pad 148 of the column housing 110. Further, by virtue of a single fastener attachment made possible by the present teachings, a single fastening step can be performed, simply by determining the appropriate desired location of the exposed surface relative to the side wall for the steering column assembly being made, and tightening the fastener 128 to an appropriate load state (e.g., to a suitable or predetermined torque level). Trial and error can thus be avoided.

Figure 5:
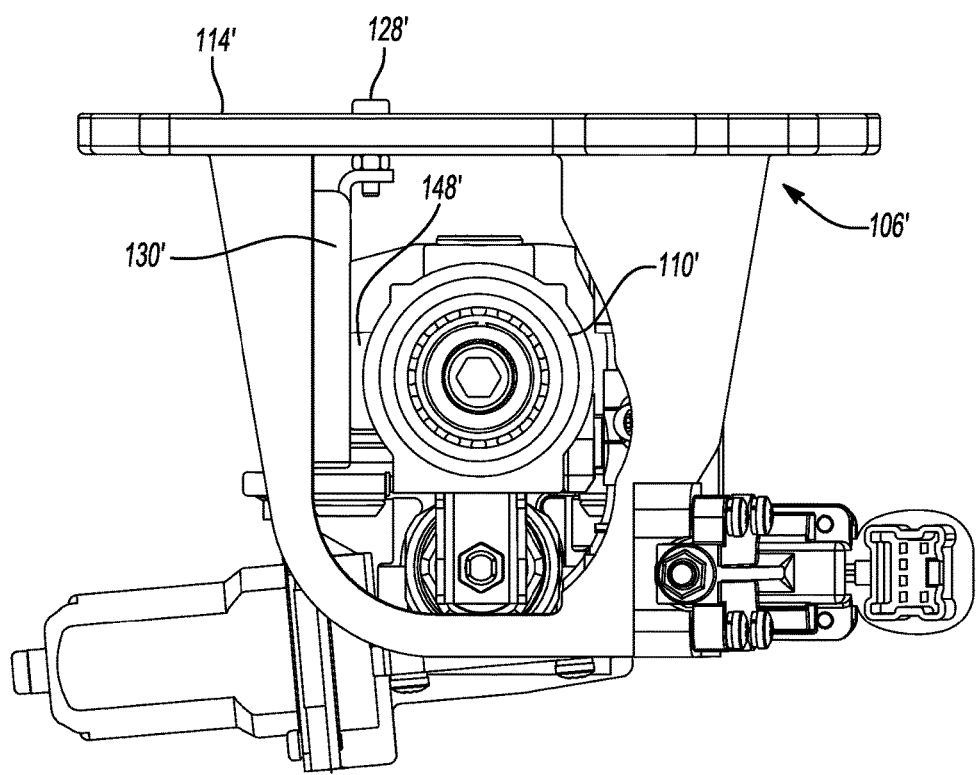
FIG. 5 is a sectional view facing forward of a steering column assembly to illustrate another spacer attachment.

FIG. 5 illustrates another possible spacer arrangement. In this approach a spacer 130' is connected to a top bracket 106' by way of a fastener 128'. The fastener 128' penetrates through a throughhole in the top surface 114' of the top bracket 106'. The spacer 130' that is shown includes an inverted "L-shaped" structure. It opposes a column housing 110' having a pad 148' located on a side of the housing. The throughhole through the upper plate portion (e.g., in the top surface 114') may be round, or an elongated slot for permitting adjustment of the spacer relative to the column housing. Alternatively, or in addition, an upper flange of the spacer 130', to which the fastener attaches, may have a throughhole adapted for allowing positional adjustment relative to the fastener.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

Relative dimensions and/or proportions disclosed herein (e.g., in the written text as well as the drawings) are part of the teachings, even if not explicitly recited.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described.

What is claimed is:

1. A steering column assembly for an automotive vehicle, comprising:
    a. a column housing having a longitudinal axis;
    b. a steering shaft that is adapted to receive a steering wheel, is supported for rotation in the column housing, and has a longitudinal axis that is coaxial with the column housing;
    c. at least one bracket structure adapted for mounting the steering column assembly within the automotive vehicle, the at least one bracket structure including a side wall portion having a surface that has an optionally inclined portion, relative to a generally vertical plane through the longitudinal axis of the column housing, and that is in generally opposing facing relation with a portion of the column housing, the side wall portion and the column housing being separated by a gap, wherein the column housing is pivotally connected within the automotive vehicle relative to the at least one bracket structure;
    d. a tilt subassembly that is adapted for selectively raising or lowering the steering shaft and column housing along a generally vertical axis of travel; and
    e. at least one spacer that:
        i. is mountable by a fastener to the at least one bracket structure within the gap;
        ii. has an exposed contact surface; and
        iii. is mountable:
            1. by a single fastener or more than one fastener so that the exposed contact surface is translatable in a direction for filling any remaining gap between the column housing and the exposed contact surface, wherein the direction is at least partially along an axis generally transverse to the longitudinal axis of the column housing,
            2. by a fastener for controlled adjustable movement of the at least one spacer in at least one axis that is generally parallel to a generally vertical plane through the longitudinal axis of the column housing so that the exposed contact surface is translatable in a direction for filling any remaining gap between the column housing and the exposed contact surface, or
            3. both (1) and (2);
    wherein the exposed contact surface of the at least one spacer is in facing relation with at least one portion of the column housing and is positioned so that the at least one portion of the column housing slidingly contacts at least a portion of the exposed contact surface when the steering shaft is raised or lowered by way of the tilt subassembly; and
    wherein the at least one spacer is configured as a wedge.

2. The steering column assembly of claim 1, wherein an inner column tube is telescopically located within the column housing and is adapted to rotatably support the steering shaft, and is adapted to be translated in a fore and an aft direction relative to the column housing for telescopic adjustment of the steering column assembly.

3. The steering column assembly of claim 1, wherein the column housing is pivotally connected relative to the at least one bracket structure.

4. The steering column assembly of claim 3, wherein the column housing is pivotally connected to the at least one bracket structure at or proximate a forward end of either or both of the column housing or the at least one bracket structure.

5. The steering column assembly of claim 1, wherein the at least one bracket structure includes a plate portion adapted to be mounted to a vehicle structure, a downwardly projecting side wall structure that opposingly flanks at least one side of the column housing, and the at least one bracket structure is adapted for pivotal connection with the column housing.

6. The steering column assembly of claim 1, wherein the at least one bracket structure consists essentially of a bracket structure that includes a plate portion adapted to be mounted to a vehicle structure and a collar that is downwardly disposed and connected to the plate portion and which is adapted to receive the column housing therethrough, the at least one bracket structure including a downwardly projecting side wall structure that is generally orthogonal relative to the plate portion and that flanks at least one side of the column housing.

7. The steering column assembly of claim 1, wherein the at least one spacer is secured to the at least one bracket structure by at least one fastener.

8. The steering column assembly of claim 1, wherein the at least one spacer is secured to the at least one bracket structure by only one fastener.

9. The steering column assembly of claim 1, wherein the at least one spacer is secured to the at least one bracket structure by at least one fastener that penetrates through an elongated slot in the downwardly projecting side wall structure of the at least one bracket structure.

10. The steering column assembly of claim 1, wherein the wedge includes a throughhole located generally at a midpoint along a length of the wedge or away from the midpoint and toward an end of the wedge.

11. The steering column assembly of claim 1, wherein the at least one spacer is adapted for translation in a direction for filling any remaining gap between the column housing and the exposed contact surface by sliding against an inclined side wall of the at least one bracket structure in a manner that as sliding proceeds, at least a portion of the exposed contact surface is urged toward the column housing.

12. A steering column assembly for an automotive vehicle, comprising:
  a. an inner column tube;
  b. a steering shaft supported for rotation at least in part by the inner column tube and having a longitudinal axis,
  c. at least one bracket structure adapted for receiving at least a portion of the steering shaft and for mounting the steering column assembly within the automotive vehicle, the at least one bracket structure including a side wall portion having an optionally inclined surface that is in generally opposing facing relation with a portion of the steering shaft, wherein the at least one bracket structure includes a plate portion adapted to be mounted to a vehicle structure and a collar that is downwardly disposed and connected to the plate portion and which is adapted to receive the column housing therethrough, the at least one bracket structure including a downwardly projecting side wall structure that is generally orthogonal relative to the plate portion and that flanks at least one side of the column housing;
  d. a tilt subassembly that is adapted for selectively raising or lowering the steering shaft along a generally vertical axis of travel;
  e. a column housing adapted for a generally upward and downward pivotal translation relative to the at least one bracket structure, and being adapted to receive the inner column tube, and is adapted to permit steering shaft tilt adjustment by way of the tilt subassembly; and
  f. at least one vertically and/or longitudinally adjustable spacer having an exposed surface, and being disposed between the column housing and the at least one bracket structure and being mounted to the optionally inclined surface of the side wall portion of the at least one bracket structure, wherein the exposed surface of the at least one spacer is in facing relation with at least one portion of the column housing and is positioned so that the at least one portion of the column housing slidingly contacts at least a portion of the exposed surface when the steering shaft is raised or lowered by way of the tilt subassembly; and
  wherein the spacer is configured as a wedge.

13. The steering column assembly of claim 12, wherein the inner column tube is adapted to be translated in a fore and an aft direction relative to the column housing for telescopic adjustment of the steering column assembly.

14. The steering column assembly of claim 13, wherein the inner column tube is adapted to be translated by a motor in a fore and an aft direction relative to the column housing for telescopic adjustment of the steering column assembly, and the steering column assembly also includes the motor.

15. The steering column assembly of claim 12, wherein the at least one bracket structure includes a plate portion adapted to be mounted to a vehicle structure, a downwardly projecting side wall structure that flanks at least one side of the column housing, and is adapted to be located at or proximate a forward end of the at least one bracket structure for pivotal connection with the column housing.

16. The steering column assembly of claim 12, wherein the at least one spacer is secured to the at least one bracket structure by at least one fastener.

17. The steering column assembly of claim 12, wherein the at least one spacer is secured to the at least one bracket structure by at least one fastener that penetrates through an elongated slot in the downwardly projecting side wall structure of the at least one bracket structure.

18. The steering column assembly of claim 12, wherein the wedge includes a throughhole.

19. The steering column assembly of claim 12, wherein, an angle of incline of the side wall structure of the bracket structure, any angle of incline of the at least one spacer, or both is less than about 10°.

20. The steering column assembly of claim 12, wherein the at least one bracket structure, the column housing, or both, are cast metal structures.

* * * * *